United States Patent
Shibata

(10) Patent No.: US 9,835,459 B2
(45) Date of Patent: Dec. 5, 2017

(54) ELECTRONIC DEVICE, AND METHOD AND PROGRAM FOR DISPLAYING NAME OF SEARCH OBJECT CANDIDATE

(71) Applicant: Alpine Electronics, Inc., Tokyo (JP)

(72) Inventor: Tadao Shibata, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 295 days.

(21) Appl. No.: 13/800,753

(22) Filed: Mar. 13, 2013

(65) Prior Publication Data
US 2014/0013261 A1    Jan. 9, 2014

(30) Foreign Application Priority Data
Jul. 4, 2012   (JP) .................... 2012-150050

(51) Int. Cl.
*G06F 3/048* (2013.01)
*G01C 21/26* (2006.01)
(Continued)

(52) U.S. Cl.
CPC ........... *G01C 21/26* (2013.01); *G01C 21/367* (2013.01); *G01C 21/3673* (2013.01); *G01C 21/3682* (2013.01); *G06F 3/0485* (2013.01)

(58) Field of Classification Search
CPC ............. G06F 17/30241; G06F 3/0482; G06F 3/0485; G06F 17/248; G06F 17/30011; G06F 17/30902; G06F 21/6218; G06F 2203/04803; G06F 2203/04806; G06F 2221/2141; G06F 3/0346; G06F 3/04817;
(Continued)

(56) References Cited

U.S. PATENT DOCUMENTS 5,587,911 A * 12/1996 Asano ............... G01C 21/3632
340/995.19
6,240,361 B1 * 5/2001 Ise ....................... G01C 21/367
340/995.14
(Continued)

FOREIGN PATENT DOCUMENTS

JP    H1151687        2/1999
JP    2000-180194     6/2000
(Continued)

OTHER PUBLICATIONS

Notification of Reasons for Refusal for patent application No. 2012-150050 dated Nov. 17, 2015, 7 pages.

*Primary Examiner* — William Bashore
*Assistant Examiner* — Rayeez Chowdhury
(74) *Attorney, Agent, or Firm* — Brinks Gilson & Lione

(57) ABSTRACT

An electronic device including a navigation function, includes a display unit configured to display road map data on a display screen, a scroll unit configured to scroll a road map screen display on the display screen in response to a user input, a determination unit configured to determine if the scrolling has stopped, an identification unit configured to identify, when it is determined that the scrolling has stopped, a search object candidate specified by a position at which the scrolling has stopped, a selection unit configured to select a search object candidate, an acquisition unit configured to acquire name data of the search object candidate, and a synthesis and display unit configured to synthesize and display the name data onto the road map data.

21 Claims, 10 Drawing Sheets

(51) Int. Cl.
*G06F 3/0485* (2013.01)
*G01C 21/36* (2006.01)

(58) Field of Classification Search
CPC ... G06F 3/0483; G06F 3/0486; G06F 11/1451
See application file for complete search history.

(56) References Cited

U.S. PATENT DOCUMENTS

| | | | |
|---|---|---|---|
| 7,991,543 B2 | 8/2011 | Hayashi et al. | |
| 2004/0138806 A1* | 7/2004 | Ichida | G09B 29/007 |
| | | | 701/532 |
| 2004/0186662 A1* | 9/2004 | Morie | G01C 21/367 |
| | | | 701/532 |
| 2004/0236507 A1 | 11/2004 | Maruyama et al. | |
| 2005/0085999 A1* | 4/2005 | Onishi | G01C 21/3682 |
| | | | 701/454 |
| 2005/0162444 A1* | 7/2005 | Asami | G01C 21/367 |
| | | | 345/619 |
| 2007/0260395 A1* | 11/2007 | Matsuoka | G01C 21/3614 |
| | | | 701/425 |
| 2008/0306684 A1* | 12/2008 | Yamazaki | G01C 21/3673 |
| | | | 701/532 |
| 2009/0088964 A1* | 4/2009 | Schaaf | G01C 21/367 |
| | | | 701/532 |
| 2011/0161007 A1* | 6/2011 | Suzuno | G01C 21/20 |
| | | | 701/532 |

FOREIGN PATENT DOCUMENTS

| | | |
|---|---|---|
| JP | 2002-243489 | 8/2002 |
| JP | 2004-347420 | 12/2004 |
| JP | 2005-099279 | 4/2005 |
| JP | 2007-128329 | 5/2007 |
| JP | 2010-230722 | 10/2010 |

\* cited by examiner

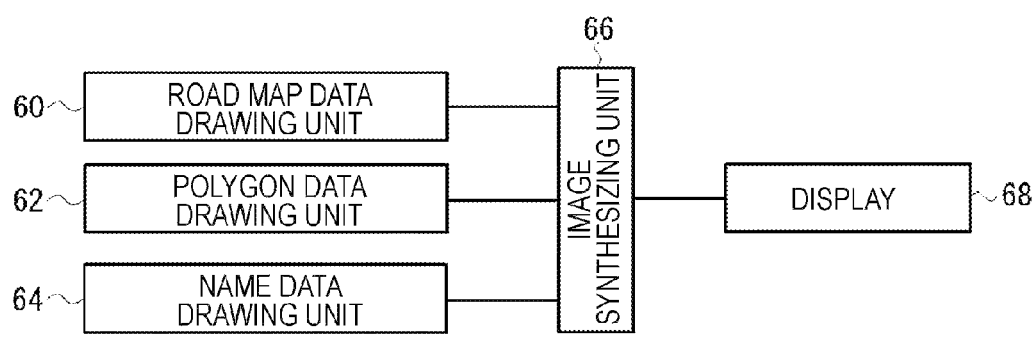

↑ SELECTED

↓ SELECTED

ELECTRONIC DEVICE, AND METHOD AND PROGRAM FOR DISPLAYING NAME OF SEARCH OBJECT CANDIDATE

CROSS-REFERENCE TO RELATED APPLICATION

This application claims priority to and benefits of Japanese Patent Application Serial No. 2012-150050, filed on Jul. 4, 2012, the entire contents of which are incorporated herein by reference.

BACKGROUND

1. Field of the Invention

Embodiments of the present invention relate to a method for displaying a name or the like of an establishment or a road in an electronic device which includes a navigation function.

2. Description of the Related Art

A navigation system includes a function to inform a user of a road condition in the periphery of an own-vehicle position, to guide a user through a route to a destination, and to give notice of road traffic information such as traffic congestion, for example. To facilitate searching or setting of a destination, a transit point or the like, the navigation system further includes a function to search for an establishment or the like by genre, search for a name of an establishment by Japanese syllabary, search by a phone number, search the periphery of an own-vehicle position, and search by map scroll, for example. The search by map scroll searches for an establishment, a road, or the like displayed on a map while a user scrolls the map in an arbitrary direction.

It would be inconvenient for a user to not be able to check the condition on the periphery of a destination (such as the form of an intersection and a building to be the reference for the destination) when an establishment or the like searched by the map scroll is set to be the destination. Accordingly, in a navigation system described in JP 2000-180194 A, a frame map showing the road condition on the periphery of the destination is displayed on a road map screen. The frame map is a simplified map formed by simplifying road map data.

SUMMARY

FIG. 1A is a display example of the map scroll search performed in the related art. In the case where a display supports a touch panel function, a road map screen 100 is switched to a scroll mode once touched by a finger where, for example, a plurality of arrows indicating a scroll direction is displayed on a road screen, a road map on which is then scrolled in the direction of any arrow touched by a user as long as the arrow is being touched. The road map screen can also be scrolled by using a user input such as a cursor key device in addition to the touch operation.

A cross-hair cursor C which specifies a search object candidate is fixedly displayed at the approximate center of the road map screen 100, which moves relative to the cross-hair cursor. When the map scroll is stopped, the search object candidate specified by the cross-hair cursor C is identified so that the name of the search object candidate is displayed at a screen top 102. The search object candidate is an establishment, a road, a mountain, a river, a lake, a park, or a track (railroad) that can be a possible destination or transit point. FIG. 1A illustrates an example of a road search, where the cross-hair cursor C is focused on a road X so that the road X is selected as the search object candidate and that the name of the road X "○○ Street" is displayed at the screen top 102.

Not all the names of the roads are displayed in a current navigation system for the reason of a screen resolution, a limitation on a display font, the control on an overlapping letter, or the like. In the example illustrated in FIG. 1A, a "P Street" which is the name of a relatively major highway is displayed while the names of the other roads are not displayed. This means that, when searching for an arbitrary road by the map scroll search, a user cannot check the name of the road unless he/she focuses coordinates of the cross-hair cursor C on the position of the target road. The name of a road can be displayed by increasing a map scale (having a short-range scale) though it would narrow down a search range, making it less easy to find the search object candidate. On the other hand, a road can be displayed on the road map by searching for the road using an address search function. It is often the case, however, that the road is on the periphery of the position being scrolled when a user searches for the road by the map scroll function, whereby it is inconvenient that the user cannot search for the road by the map scroll.

FIGS. 1B and 1C illustrate an example in which the map scale of the road map screen in FIG. 1A is switched to a wide area. When the map scale is switched to the wide area as illustrated in FIGS. 1B and 1C, the name of a peripheral road placed high in a road classification (such as a main highway in an upper class) is displayed while the name of a road placed low in the road classification (in a lower class) is not displayed. In the example illustrated in FIG. 1B, a "Q Street" is displayed as the name of a highway while the name of the road placed low in the road classification, namely the "P Street" illustrated in FIG. 1A, is not displayed. Moreover, in the example illustrated in FIG. 1C where the map scale is switched to an even wider area, an "R Street" and an "S Street" are displayed as the names of roads in the upper class, whereas the "Q Street" is not displayed anymore. It is therefore not always easy to find the target road by using the map scroll function when the map scale is switched to the wide area to search for the road. The aforementioned problem arises as well when an establishment or a There has been the problem in the map scroll search of the related art that a target search object candidate cannot be displayed sufficiently, so that a user cannot easily find the search object candidate, thereby requiring a great amount of user operation and making it extremely user-unfriendly.

Embodiments of the present invention are provided to solve the aforementioned problems. An object of certain embodiments of the present invention is to provide an electronic device which facilitates the map scroll search and in which the user operation is improved.

Another object of embodiments of the present invention is to provide an electronic device which can display more names of a search object candidate than it has been in the related art by the map scroll search, and to provide a method for displaying the name of the search object candidate.

An electronic device including a navigation function according to the present invention includes: a display means on which road map data is displayed; a scroll means which scrolls, in response to a user input, a road map screen displayed by the display means; a determination means which determines whether or not the scrolling by the scroll means has been stopped; an identification means which identifies, when it is determined that the scrolling has been stopped, a search object candidate specified by a position at which the scrolling has been stopped; a selection means which selects a search object candidate being the same type as that of the search object candidate identified by the identification means and being included in the road map screen displayed when the scrolling has been stopped; an acquisition means which acquires name data of the search object candidate selected by the selection means; and a synthesis and display means which synthesizes and displays the name data acquired by the acquisition means onto the road map data, the scrolling of which has been stopped.

Preferably, the synthesis and display means ends the synthesis and the display of the name data when a fixed period of time has elapsed. Preferably, the electronic device further includes a deformed screen creation means which creates a deformed screen on the basis of the road map data displayed when the scrolling has been stopped, wherein the synthesis and display means synthesizes and displays the name data onto the deformed screen created. Preferably, the electronic device further includes a display mode determination means which determines a display mode between a specified name display mode in which a name of a search object candidate specified by a position at which the scrolling has been stopped is displayed, and a periphery name display mode in which a name of the search object candidate selected by the selection means is displayed. Preferably, the display mode determination means determines the display mode on the basis of a user input. Preferably, the display mode determination means displays, on the road map screen being displayed, a user input button by which a user selects either the specified name display mode or the periphery name display mode. Preferably, the display means displays, on the road map screen displayed when the scrolling has been stopped, an input button by which a user changes a map scale, and the selection means selects a search object candidate from the road map screen, the map on which is scaled, when a user has changed the map scale through the input button. Preferably, the display means displays, on the road map screen displayed when the scrolling has been stopped, an input button by which a user performs display setting, and enables the display of a name of the search object candidate selected by the selection means when a user has performed the display setting through the input button. Preferably, the synthesis and display means ends the synthesis and the display of the name data in response to the scrolling started by the scroll means. Preferably, the selection means selects a search object candidate, a name of which is not displayed on the road map screen displayed when the scrolling has been stopped.

A method for displaying a name of a search object candidate in a map scroll search performed by an electronic device including a navigation function according to the present invention includes steps of: scrolling a road map screen when a map scroll search has been activated; determining whether or not the scrolling has been stopped; identifying, when it is determined that the scrolling has been stopped, a search object candidate specified by a position at which the scrolling has been stopped; selecting a search object candidate which is the same type as that of the identified search object candidate and is included in the road map screen displayed when the scrolling has been stopped; acquiring name data of the selected search object candidate; and synthesizing and displaying the acquired name data onto road map data, the scrolling of which has been stopped.

A program for displaying the name of a search object candidate in a map scroll search performed by the electronic device including the navigation function according to the present invention includes steps of: scrolling a road map screen when the map scroll search has been activated; determining whether or not the scrolling has been stopped; identifying, when it is determined that the scrolling has been stopped, a search object candidate specified by the position at which the scrolling has been stopped; selecting a search object candidate which is the same type as that of the identified search object candidate and is included in the road map screen displayed when the scrolling has been stopped; acquiring name data of the selected search object candidate; and synthesizing and displaying the acquired name data onto road map data of which the scrolling has been stopped.

According to the present invention, when a user has stopped scrolling the road map, the name of a search object candidate which is not normally displayed would be displayed on the road map of which the scrolling has been stopped, so that the user can find the search object candidate more easily than before.

BRIEF DESCRIPTION OF THE DRAWINGS

FIG. 3 is a diagram illustrating a functional configuration of a display unit illustrated in FIG. 2A;

FIG. 4 is a diagram illustrating a data structure of a road, a geographic name, and an establishment or the like that can be a search object candidate in the map scroll search of one embodiment;

FIG. 6A illustrates an example in which a scroll instruction is to be input, and FIG. 6B illustrates an example of a cross-hair cursor which specifies coordinates when scrolling has been stopped;

FIG. 8A illustrates an example of a specified name display mode, FIG. 8B illustrates an example of a periphery name display mode according to the first embodiment, and FIG. 8C illustrates an example of a periphery name display mode according to a second embodiment;

FIG. 9A illustrates an example of a specified name display mode, FIG. 9B illustrates an example of a periphery name display mode according to the first embodiment, and FIG. 9C illustrates an example of a periphery name display mode according to the second embodiment;

DETAILED DESCRIPTION

Embodiments of the present invention will now be described in detail with reference to the drawings. An electronic device according to the present invention may be fixedly mounted on a moving body such as an automobile, brought into the moving body by a user, or may be detachable from the moving body. The electronic device according to the present invention is loaded with a navigation function but may also include another function in an integrated manner such as a function to reproduce audio/video data, receive television/radio broadcast, or execute application software. Moreover, the electronic device according to the present invention may itself store road map data needed to execute the navigation function in a storage unit, or may obtain the required road map data from a distribution site or a distribution server through data communication means. The navigation system mounted in a vehicle will be described below as an example of the electronic device.

Figure 1A:
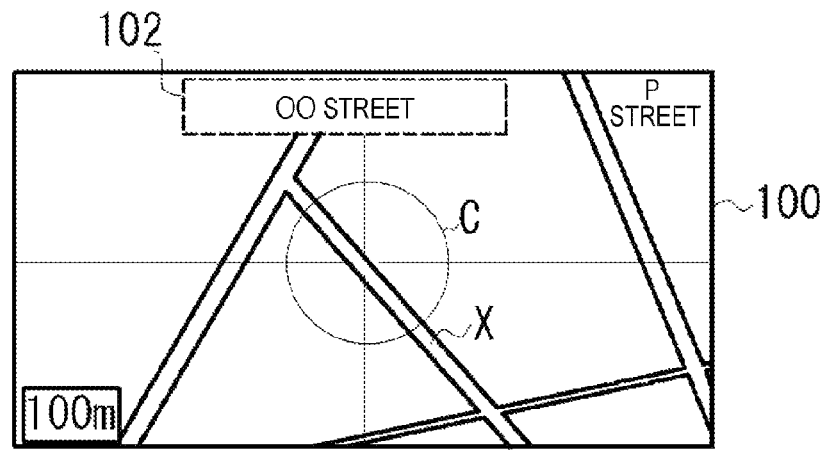
FIGS. 1A to 1C are a set of display examples of a map scroll search performed in the related art.
Figure 1B:
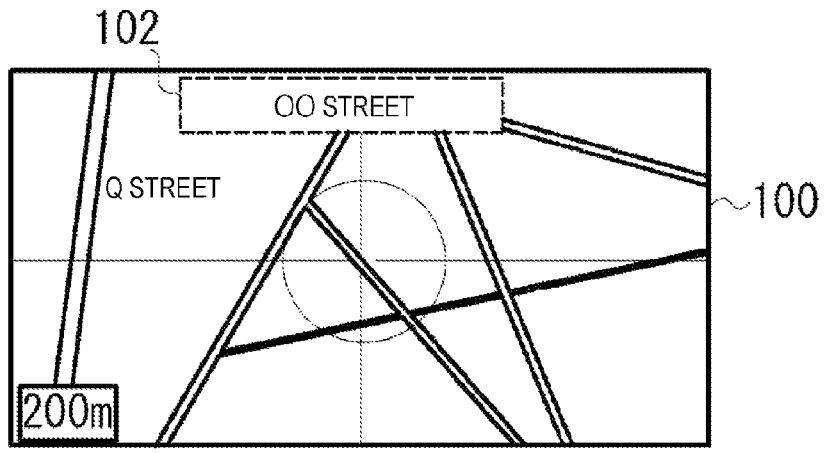
Figure 1C:
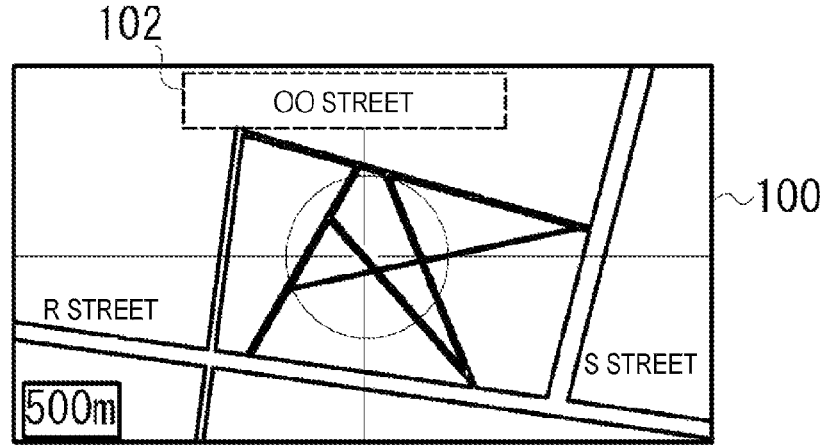
Figure 2A:
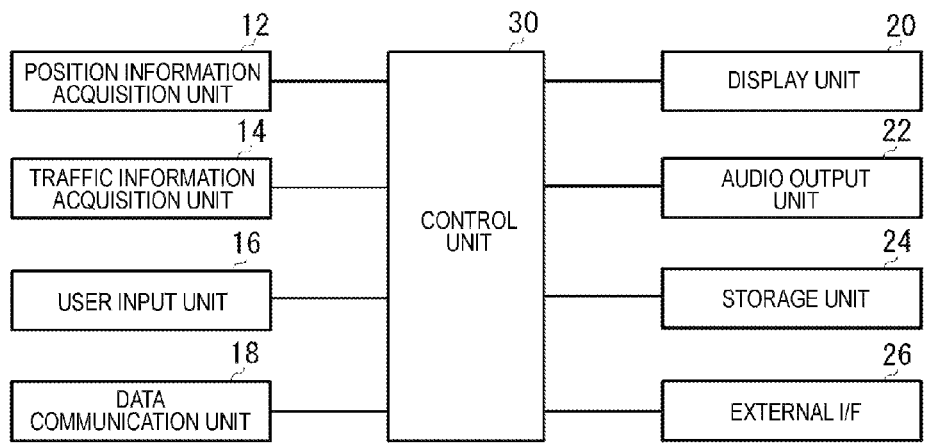
FIGS. 2A and 2B are block diagrams illustrating a navigation system according to an embodiment of the present invention.
Figure 2B:
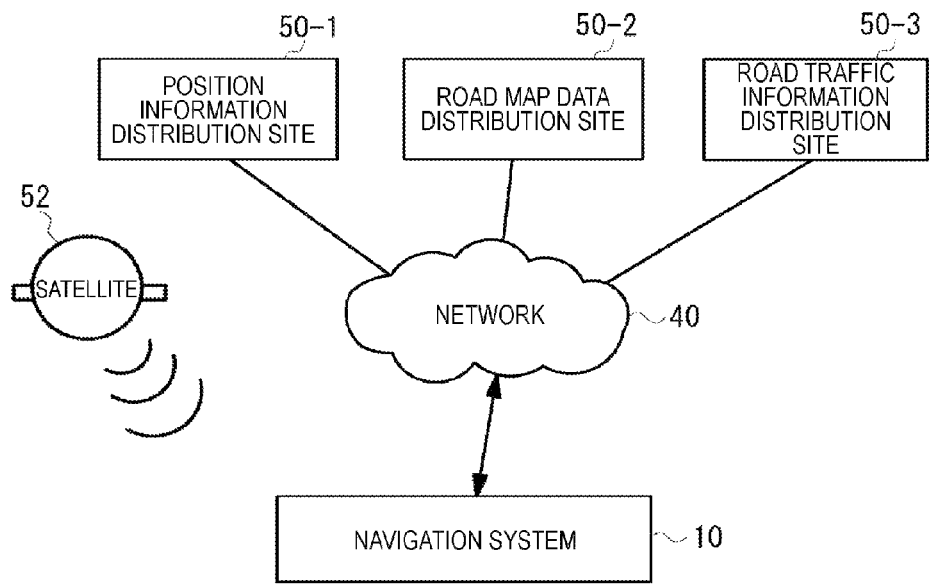

FIGS. 2A and 2B are a set of block diagrams illustrating a configuration of a navigation system according to an embodiment of the present invention. A navigation system 10 includes: a position information acquisition unit 12 which acquires information on an own-vehicle position; a traffic information acquisition unit 14 which acquires road traffic information such as congestion and traffic control information; a user input unit 16 which accepts input from a user; a data communication unit 18 which enables wired or wireless data communication with the outside; a display unit 20 which displays a road map or the like on a display; an audio output unit 22 which outputs audio; a storage unit 24; an external interface (I/F) 26 which enables a connection with an external device; and a control unit 30 which controls each unit. The configuration of the navigation system is illustrated herein as an example and is not necessarily limited to such configuration.

The position information acquisition unit 12 includes, for example, the one that detects an absolute position of an own vehicle by using a signal transmitted from a GPS satellite 52, and the one that detects a relative position of the own vehicle from a variety of sensors such as a gyro sensor and an acceleration sensor which are mounted in a vehicle. Moreover, as illustrated in FIG. 2B, the position information acquisition unit 12 can access a position information distribution site (or a distribution server) 50-1 through a network 40 to acquire information on the own-vehicle position from the site or the server. In this case, the position information acquisition unit 12 is connected to the network 40 through the data communication unit 18.

The traffic information acquisition unit 14 can acquire road traffic information superimposed on an FM radio broadcast or another broadcast wave and by wireless communication through an antenna installed on a roadside of a highway or an expressway. Moreover, as illustrated in FIG. 2B, the traffic information acquisition unit 14 can access a road traffic information distribution site (or a distribution server) 50-3 through the network 40 to acquire the road traffic information from the site or the server. In this case, the traffic information acquisition unit 14 is connected to the network 40 through the data communication unit 18.

The user input unit 16 provides an interface between a user and the navigation system 10 and may include an input key device, a touch panel, a voice recognition device, or the like. Preferably, a road map screen displayed on the display unit 20 can be scrolled in an arbitrary direction by the input key device or the touch panel when performing the map scroll search.

The data communication unit 18 enables wired or wireless data communication using WiFi, a LAN, infrared communication, a telephone line, or the like. The data communication unit 18 may have the function thereof built in the navigation system or may be externally connected to a mobile phone or a smartphone to use the communication function thereof. As described above, the data communication unit 18 can connect the navigation system to a variety of data distribution sites through the network 40 as illustrated in FIG. 2B.

The display unit 20 displays a road map on the display or a name of a search object candidate on the road map being scrolled in the map scroll search. The display unit 20 also displays a menu screen and a search screen which is used when searching for an establishment or the like. The audio output unit 22 outputs the audio for guiding and informing of a route to a destination as well as the road traffic information acquired by the traffic information acquisition unit 14 in the audio format.

FIG. 3 illustrates a road map display function of the display unit 20. A road map data drawing unit 60 draws and provides to an image synthesizing unit 66 the road map data to be displayed on a display 68 such as the road map data on the periphery of the own-vehicle position and the road map data to be scrolled. A polygon data drawing unit 62 draws and provides to the image synthesizing unit 66 a variety of polygons such as an establishment icon, an own-vehicle position mark, and data such as route data and road traffic data that are synthesized onto the road map data. A name data drawing unit 64 draws and provides to the image synthesizing unit 66 name data or the like of the search object candidate synthesized onto the road map. The image synthesizing unit 66 synthesizes image data received from the road map data drawing unit 60, the polygon data drawing unit 62, and the name data drawing unit 64 and provides display data to the display 68. The structure of the display unit 20 in FIG. 3 is illustrated as an example and is not limited to what is illustrated. For example, the polygon data drawing unit 62 may draw polygon data of a road to be synthesized onto the map.

The storage unit 24 can store the road map data or the like required for the operation of the navigation system 10. For example, the storage unit 24 includes a high-capacity storage unit into which a database such as the road map data and establishment data can be stored. In another example, as illustrated in FIG. 2B, the storage unit 24 can access a road map data distribution site 50-2 through the network 40 to acquire the required road map data or the like from the site. In this case, the storage unit 24 is connected to the network 40 through the data communication unit 18.

The road map data includes road (link) data, intersection data and the like. The road data includes position information representing coordinates of a starting point and an end point of a link, a road class, a road name, and the like. The intersection data includes information related to the starting point or the end point of the road, the class of an intersection, and the like. The establishment data includes a variety of information on a restaurant, a gas station, a school, a bank, a supermarket, an airport, a station, and a track as a POI (Point of Interest), and includes position information representing a coordinate position of each establishment, the name of the establishment, information on the establishment icon, and genre information which classifies the establishment by category, for example. The road map data and the establishment data are used when the road map is displayed by the display unit 20.

The map scroll search of the present embodiment includes a function to identify a search object candidate (such as a road, an establishment, or a geographic name) and select a search object candidate of the same type as that of the identified search object candidate as a display object when a user has stopped scrolling the road map screen. FIG. 4 illustrates an example of data used in performing this function. Three search object candidates, namely road data, geographic name data, and establishment data, will be illustrated in the present embodiment to simplify the description. This however is for the illustration purpose only, and thus the search object candidate is not limited to the three types, and the definition of the type can be arbitrarily determined by a user or a design.

A link ID is assigned to road data 70 as an identifier therefor. The road data 70 includes position information including the coordinates of a starting point and an end point of a link, a road name, and attribute information. The road name corresponds to a street name of the road (such as XX Street) or a name by which the road is identified (such as Route ○○), for example. The attribute information includes a road class, lane information, and identification of a node of an intersection connected to the road, for example.

Geographic name data 72 corresponds to information related to a POI on the map such as a lake, a marsh, a river, and a scenic area, each of which is provided with a geographic name ID as an identifier. The geographic name data includes position information, a geographic name, and attribute information. The position information includes coordinates of the geographic name, while the geographic name includes the name of the geographic place such as a ○○ Lake or a XX River. The attribute information includes information related to a class of the geographic name and polygon data representing the geographic name.

Establishment data 74 corresponds to information related to an establishment such as a restaurant, a station, a gas station, a store, a school, and a bank, each of which is provided with an establishment ID as an identifier. Position information includes coordinates of an establishment, while an establishment name represents the name of the establishment. Attribute information includes information related to a genre (or a category) of the establishment and icon data representing the establishment.

Figure 5:
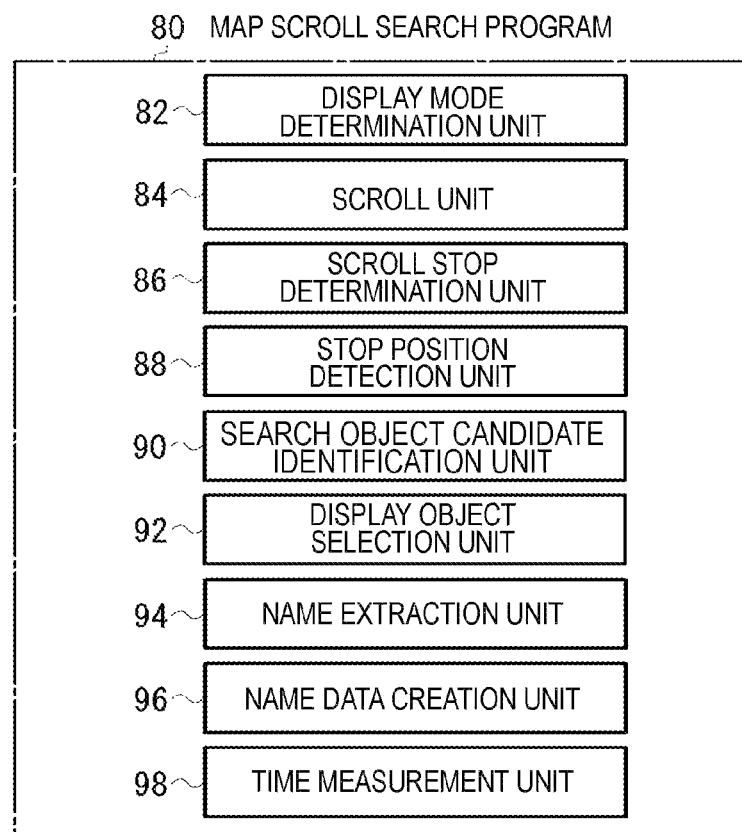
FIG. 5 is a diagram illustrating a functional configuration of a map scroll search program of one embodiment.

The control unit 30 includes a microcontroller including a ROM, a RAM, or the like in a preferred aspect, where a variety of programs for controlling the operation of the navigation system are stored in the ROM or the RAM. The program includes, for example, the one that searches for a destination or a transit point, the one that searches for an optimal route to a destination, and the one that guides to and informs of a route to a destination. The program that searches for a destination or a transit point includes a method of hierarchically narrowing down a plurality of destination candidates from the menu screen or the like, and a method of searching for a desired destination by scrolling the road map screen displayed on the display. FIG. 5 illustrates a function of a map scroll search program which executes the latter of the aforementioned methods, namely, the search by scrolling.

A map scroll search program 80 according to the present embodiment is activated when a user input matches a predetermined condition. For example, the map scroll search program 80 would be activated when a user touches the road map screen or gives an instruction for the scroll search from the input key device while the road map is displayed on the display. The map scroll search program 80 includes the function as follows.

A display mode determination unit 82 determines, in the map scroll search, a display mode between a specified name display mode which displays the name of a search object candidate specified at the position where the scrolling has been stopped, and a periphery name display mode which displays the name of a search object candidate on the periphery of the position where the scrolling has been stopped. The display mode determination unit 82 can determine the display mode between the specified name display mode and the periphery name display mode according to a user setting which is pre-registered in the navigation system or on the basis of a user input.

Figure 6A:
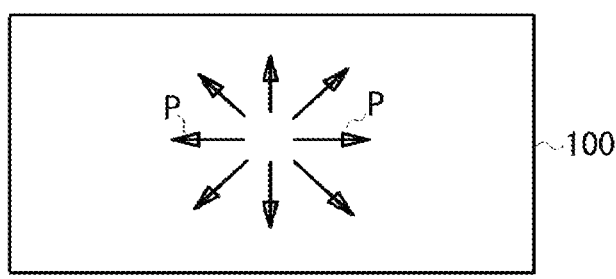
FIGS. 6A and 6B are a set of diagrams where
Figure 6B:
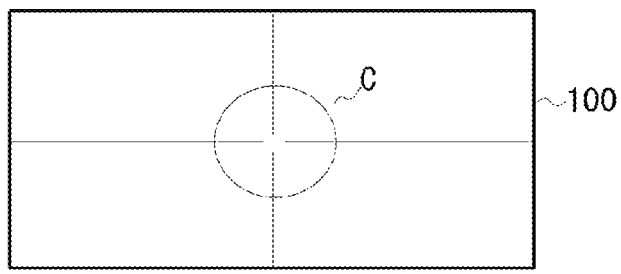

A scroll unit 84 scrolls the road map screen in response to a scroll instruction from a user. In one aspect as illustrated in FIG. 6A, the scroll unit 84 displays, on the road map screen, an arrow P at a 45-degree interval to indicate the scrolling direction so that the road map screen will be scrolled in the direction of the arrow P touched by a user for the duration that the user touches the arrow P. In another aspect, the user may input the scrolling direction from the input key device so that the road map will be scrolled in the direction for the duration that the input is being given. The road map may also be scrolled in response to the direction into which a finger moves on the touch panel. Moreover, the scroll unit 84 displays a cross-hair cursor C oriented toward the center of the circle at the approximate center on a screen 100, as illustrated in FIG. 6B, where a search object candidate is specified by the coordinates of the cross-hair cursor C.

A scroll stop determination unit 86 determines whether or not the user has stopped scrolling. In the case where the scrolling is instructed by the touch panel, for example, it is determined that the scrolling has been stopped at a point when the finger has left the touch panel. Likewise, in the case where the input key device is used, it is determined that the scrolling has been stopped when the user has given the instruction to stop the scrolling.

A stop position detection unit 88 detects coordinates of the center of the cross-hair cursor C or coordinates of an area within a fixed range including the center when the scrolling has been stopped. In other words, the stop position detection unit 88 detects coordinates of the approximate center of the screen 100. The coordinate information acquired when the scrolling has been stopped is then provided to a search object candidate identification unit 90 as a stop position of the scrolling.

The search object candidate identification unit 90 identifies a search object candidate on the coordinates on the basis of the stop position provided by the stop position detection unit 88. Preferably, the search object candidate identification unit 90 identifies the road data, the establishment data, and the geographic name data corresponding to the stop position by checking the respective position information included in the road data, the establishment data, and the geographic name data that are illustrated in FIG. 4. A search object candidate corresponding to the stop position or, when there is no search object candidate corresponding to the stop position, a search object candidate closest to the stop position within a fixed range would be identified. No search object candidate will be identified when there is no search object candidate within the fixed range from the stop position.

A display object selection unit 92 selects a display object, the name of which is to be displayed, on the basis of the result of the identification by the search object candidate identification unit 90. Note that the display object selection unit 92 would select a different display object depending on the display mode determined by the display mode determination unit 82. That is, when the periphery name display mode is determined to be the display mode by the display mode determination unit 82, a search object candidate which is the same type as that of the search object candidate identified by the search object candidate identification unit 90 and is displayed on the road map screen will be selected. For example, a road will be identified as the search object candidate when the cross-hair cursor is focused on a road, in which case a peripheral road displayed on the screen will be selected as the display object. A road, the name of which has already been displayed on a normal screen, may be excluded from the display object. On the other hand, when the specified name display mode is determined to be the display mode by the display mode determination unit 82, the search object candidate identified by the search object candidate identification unit 90 will be selected alone as the display object. For example, a road focused by the cross-hair cursor will be selected alone as the display object.

A name extraction unit 94 then extracts a name of the display object selected by the display object selection unit 92. The name extraction unit 94 refers to the road data, the establishment data, and the geographic name data illustrated in FIG. 4 in extracting the name. When the display mode is set to the periphery name display mode, the name extraction unit 94 will extract all names of the search object candidates which are in the periphery of the search object candidate identified by the search object candidate identification unit 90 and have the same type as that of the identified search object candidate. On the other hand, only the name of the search object candidate identified by the search object candidate identification unit 90 will be extracted when the display mode is set to the specified name display mode.

A name data creation unit 96 creates, on the basis of the name data extracted by the name extraction unit 94, name data for the search object candidate which has been determined to be the display object. A font size of the name data may be changed according to the number of the display objects in order to avoid overlap among the names displayed. When the number of the display objects is greater than or equal to a predetermined threshold, for example, the name data can be created such that the font or the display area of the name data would become small. The font size or the display area of the name data may also be changed according to the map scale. When a road scale is set to a wide-area scale which is greater than a threshold, for example, it is presumed that there would be a number of display objects, whereby the name data can be created such that the font or the display area would become small. The name data created by the name data creation unit 96 is then drawn by a name data drawing unit 64. It is preferred that the name data drawing unit 64 draw each name at a fixed interval without overlap.

A time measurement unit 98 measures a time for which the name of the search object candidate is displayed when the display mode is set to the periphery name display mode. The measurement result is then provided to the name data drawing unit 64. It is preferred that the name data drawing unit 64 hide all the names of the search object candidate or the name other than the search object candidate specified by the cross-hair cursor C, when the name of the search object candidate has been displayed for a fixed period of time.

Figure 7:
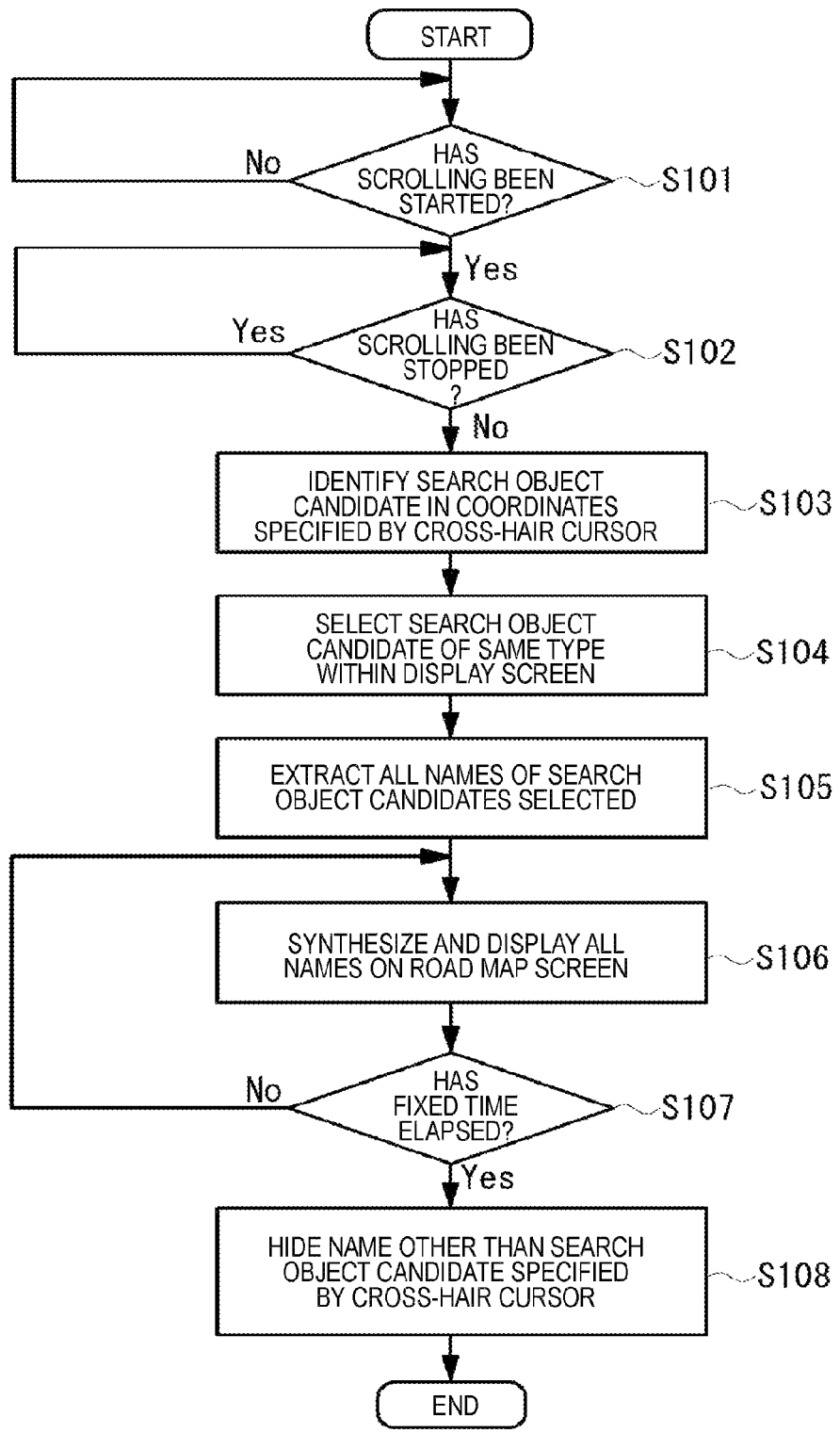
FIG. 7 is a flowchart describing an operation in the map scroll search according to a first embodiment of the present invention.

Now, the map scroll search operation of the navigation system according to a first embodiment of the present invention will be described with reference to the flow illustrated in FIG. 7. It is assumed that the periphery name display mode has been pre-registered in the navigation system by the user. While the navigation system 10 is running, the control unit 30 monitors whether or not the map scroll search has been started by the user (S101). When it is determined that the map scroll search has been started, the control unit 30 activates the map scroll search program 80 where the display mode determination unit 82 determines that the display mode is set to the periphery name display mode by referring to the user setting.

The scroll unit 84 controls the scrolling of the road map data in response to the scroll instruction from the user. That is, the image data drawn by the road map data drawing unit 60, the polygon data drawing unit 62, and the name data drawing unit 64 is provided to the image synthesizing unit 66, and the synthesized road map is scrolled on the display 68. Then, the scroll stop determination unit 86 determines whether or not the scrolling has been stopped (S102). When it is determined that the scrolling has been stopped, the stop position detection unit 88 detects the stop position indicated by the cross-hair cursor C, and then the search object candidate identification unit 90 identifies the search object candidate at the stop position (S103). A road, an establishment, or a geographic name is identified as the search object candidate when a road, an establishment, or a geographic name is at the stop position, respectively. When none of the road, the establishment, or the geographic name is present, the search object candidate will not be identified nor will the name of the search object candidate be displayed. The result of the identification of the search object candidate is used to guess the object that the user attempts to search for.

When the search object candidate has been identified, the display object selection unit 92 then selects another search object candidate which is the same type as that of the identified search object candidate and is displayed on the road map screen (S104). The name extraction unit 94 then extracts all the names of the search object candidate selected as the display object (S105), and the name data creation unit 96 creates the name data for the names. The names of the search object candidate are drawn by the name data drawing unit 64 and displayed on the road map screen for the fixed period of time (S106 and S107). The name of the search object candidate displayed in the periphery name display mode is not always displayed on the normal screen. That is, it is to be noted that the name which is not displayed on the normal screen due to the map scale, the font size, no overlapping, or the like is somewhat forcibly displayed in the periphery name display mode. The user can therefore find the target search object candidate easily within the road map screen being scrolled while the names of the search object candidate are displayed for the fixed period of time. The name of the search object candidate excluding the name of the search object candidate specified by the cross-hair cursor is displayed when the fixed period of time has elapsed (S108).

Figure 8A:
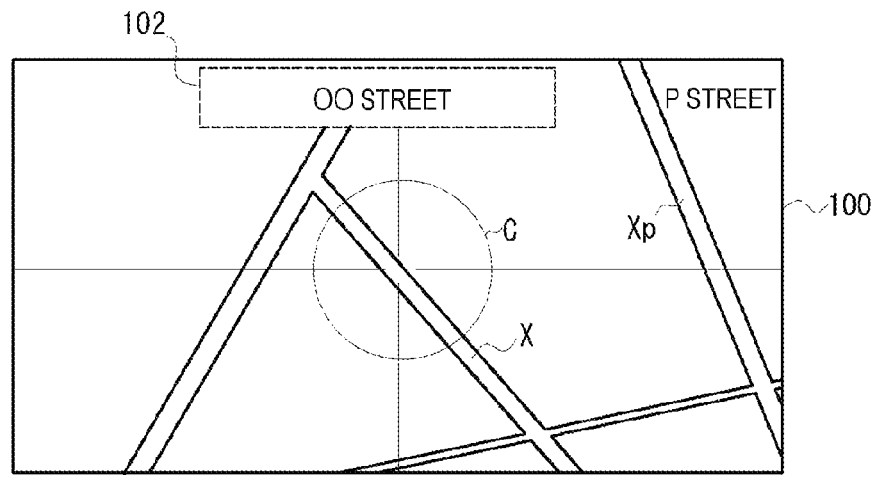
FIGS. 8A to 8C are display examples of a road name in the map scroll search according to an embodiment of the present invention, where
Figure 8B:
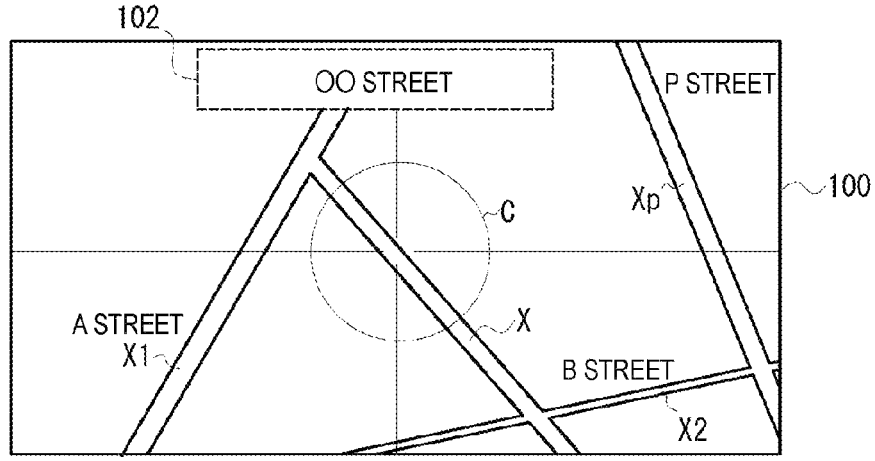

FIG. 8A illustrates a display example of the specified name display mode, while FIG. 8B illustrates a display example of the periphery name display mode. In an example illustrated in FIG. 8A, a road X is identified by the cross-hair cursor C when the scrolling has been stopped, while the name of the road X "○○ Street" is displayed at the top 102 of the screen 100. The name of the road other than the name "P Street" of a road Xp is not displayed on the normal screen. On the other hand, in an example illustrated in FIG. 8B where the display mode is set to the periphery name display mode, roads X1 and X2 which are the same type as that of the identified road X are selected as the roads to be displayed, whereby an "A Street" and a "B Street" are displayed as the names of the roads X1 and X2, respectively. The user can thus easily find the road he/she is searching for within the screen 100 on which the name of the road not displayed on the normal road map screen is displayed.

Figure 9A:
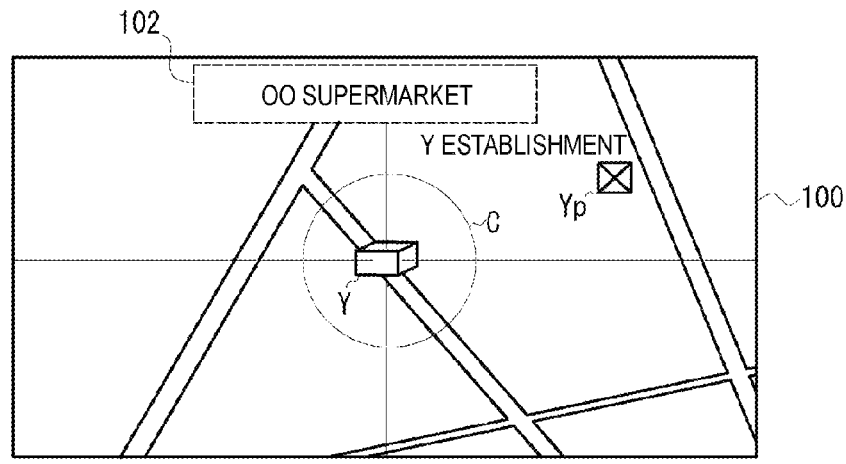
FIGS. 9A to 9C are display examples of an establishment name in the map scroll search according to an embodiment of the present invention, where
Figure 9B:
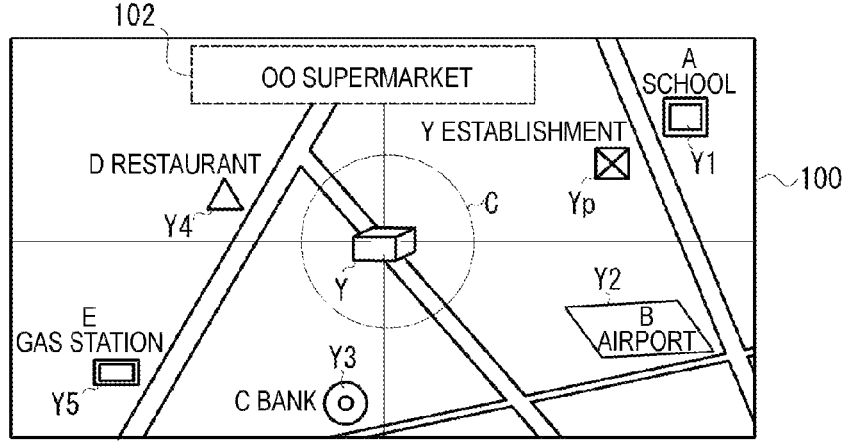

FIG. 9A illustrates a display example of the specified name display mode where the search object candidate is an establishment, while FIG. 9B illustrates a display example of the periphery name display mode where the search object candidate is an establishment. In an example illustrated in FIG. 9A, an establishment Y is identified by the cross-hair cursor C when the scrolling has been stopped, whereby the name of the establishment Y "○○ Supermarket" is displayed at the top 102 of the screen 100. The information related to another establishment other than the establishment with the name "Y establishment" and the icon of the establishment Yp is not displayed on the normal screen. On the other hand, in an example illustrated in FIG. 9B where the display mode is set to the periphery name display mode, establishments Y1 to Y5 which are the same type as that of the identified establishment Y are selected as the establishments to be displayed, whereby the names of the establishments, namely a "A School", a "B Airport", a "C Bank", a "D Restaurant", and an "E Gas Station", are displayed at a predetermined position, respectively. The user can thus easily find the establishment he/she is searching for within the screen 100 on which the name of the establishment not displayed on the normal road map screen is displayed. Note that the icon of the establishment is displayed along with the name of the establishment in the example illustrated in FIG. 9B.

Although not shown, when a geographic name (a mountain, a lake, a marsh, a coast, or a scenic area) is identified as the search object candidate by the stop position of the scrolling in the periphery name display mode, another geographic name within the screen 100 will be selected as the display object in the manner similar to what is described above, so that the name of the geographic name will be displayed for the fixed period of time. The user can thus search for the target geographic name easily.

While the road, the establishment and the geographic name have been identified as the search object candidates of different types in the above embodiment, the name of the road adjacent to the establishment or the geographic name may also be displayed together when that makes it easier for the user to search for the establishment or the geographic name. For example, the name of the road (FIG. 8B) adjacent to the establishments Y1 to Y5 and Yp may be displayed along with the names of the establishments Y1 to Y5 and Yp illustrated in FIG. 9B. It can be determined by the user setting whether or not the name of the road is displayed together.

A second embodiment of the present invention will now be described. While the name of the search object candidate is displayed onto the road map data in the periphery name display mode in the first embodiment, the name of the search object candidate is displayed for the fixed period of time on a deformed screen of the road map screen provided separately, in the second embodiment.

In the second embodiment, a map scroll search program 80 includes a deformed screen creation unit (not shown). The deformed screen creation unit creates a deformed screen by simplifying road map data being scrolled, when the scrolling has been stopped. The created deformed screen is displayed when the display mode is set to a periphery name display mode. The deformed screen is created by a method in which, in case of a road, a straight line connecting a starting point (a node) and an end point (a node) of road data is created, or a string of nodes is linearly approximated by a least squares method or the like when a plurality of roads is connected. Moreover, the thickness of the straight line representing the road may be changed according to the number of road lanes, while the coloration or the thickness of the straight line representing the road may be changed according to a road class (a national road, a prefectural road, or a municipal road) or the like. With regards to an intersection connecting a road with another road, the angle at which the roads intersect is selected from a predetermined fixed angle (30 degrees, 60 degrees, 90 degrees or the like). Information which is not related to the search object candidate may be hidden on the deformed screen as well. Similar to the first embodiment, the name of the search object candidate is then synthesized and displayed on the deformed screen created in the aforementioned manner. According to the second embodiment, a user can search for a target search object candidate more easily by the name of the search object candidate being displayed on the simplified deformed screen.

Figure 8C:
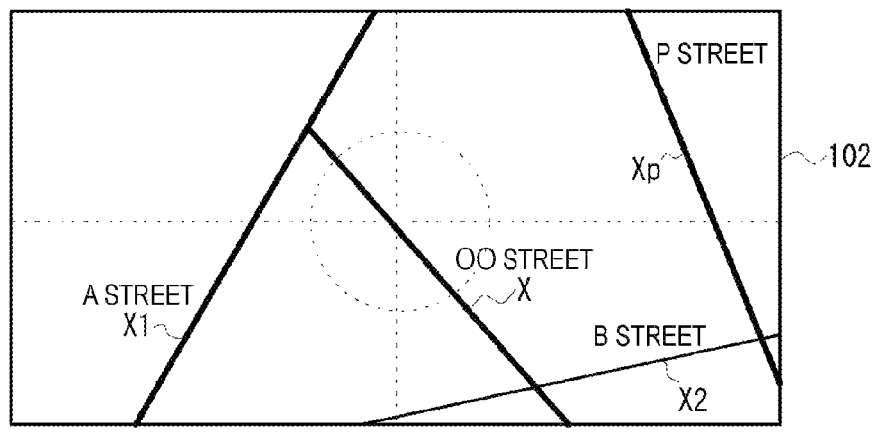

FIG. 8C is a display example of a deformed screen 102 corresponding to the road map screen 100 illustrated in FIG. 8B. When the road X is identified as the search object candidate, the other peripheral roads X1 and X2 which are the same type as that of the road X are selected as the display object, so that these roads X, X1, X2, and Xp are deformed and displayed in the form of a straight line, at which the road name is given. The major highways X and X1 are displayed in an aspect different from that of the road X2 (the line representing the major highway is thicker in FIG. 8C). Similar to the first embodiment, the deformed screen 102 is displayed for the fixed period of time. The display would be switched from the deformed screen 102 to the road map screen on which the normal scroll search is performed, when a user has operated a cursor on the deformed screen.

Figure 9C:
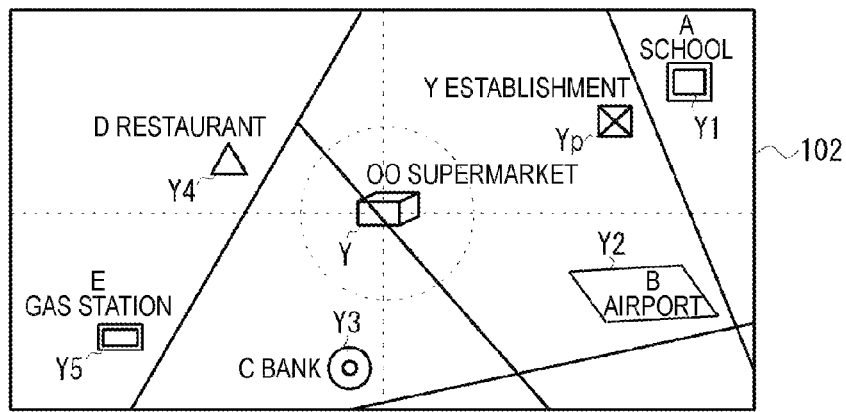

FIG. 9C is a display example of the deformed screen 102 corresponding to the road map screen 100 of the first embodiment illustrated in FIG. 9B. When the establishment Y is identified as the search object candidate, the other peripheral establishments Y1 to Y5 which are the same type as that of the establishment Y are selected as the display object, so that the names of the establishments Y to Y5 are displayed together with the icons thereof. The roads X, X1, X2, and Xp are also displayed in the deformed state. The deformed screen 102 being displayed for the fixed period of time would be removed and switched to the normal road map screen when the user has operated the cursor on the deformed screen.

Figure 10:
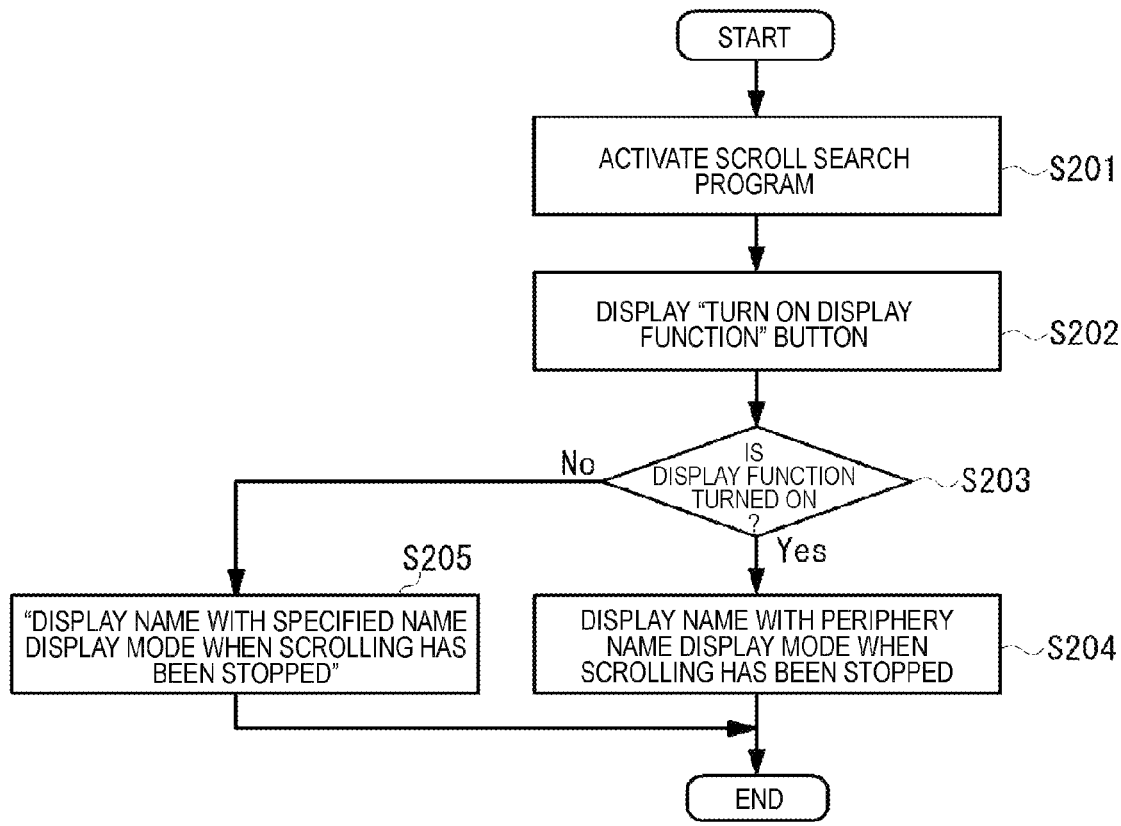
FIG. 10 is a flowchart of an operation in the map scroll search according to a third embodiment of the present invention.
Figure 11A:
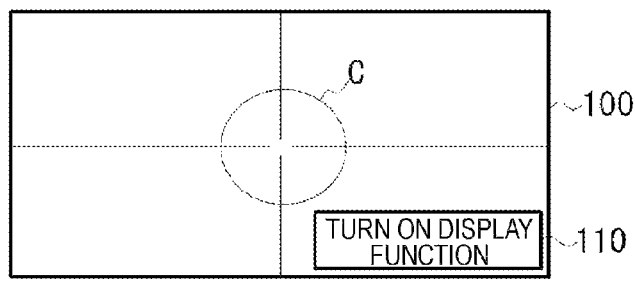
FIGS. 11A and 11B are display examples of a road map screen according to the third embodiment of the present invention.

A third embodiment of the present invention will now be described. The third embodiment relates to a user interface in the map scroll search. FIG. 10 is a flowchart describing the operation in the map scroll search according to the third embodiment. When a map scroll search program 80 (FIG. 5) is activated in response to a user input (S201), a display mode determination unit 82 displays, on a road map screen 100, a display switch button 110 which is indicated by a "turn on display function" button to turn on the display function of a periphery name display mode, as illustrated in FIG. 11A (S202). The display switch button 110 can be selected by a user. When the user selects the "turn on display function" button, the display mode determination unit 82 switches the setting from a specified name display mode to the periphery name display mode (S203).

When the periphery name display mode has been set, the name of a search object candidate would be displayed as illustrated in FIGS. 8B and 8C or FIGS. 9B and 9C in the same manner as that of the first and the second embodiments, in which, after starting the scrolling, the search object candidate is first identified at a position at which the scrolling has been stopped, and a peripheral search object candidate which is the same type as that of the identified search object candidate is selected as the display object (S204). When the periphery name display mode has not been set, on the other hand, the name of the search object candidate specified by a cross-hair cursor is displayed as illustrated in FIGS. 8A and 9A at the time the scrolling has been stopped.

Figure 11B:
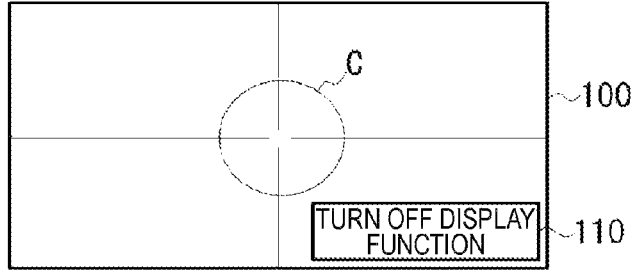

Moreover, as illustrated in FIG. 11B, the display switch button 110 indicated by a "turn off display function" button would be displayed on the road map screen when the scroll search is resumed after selecting the "turn on display function" button temporarily. When the "turn off display function" button is selected, the setting would be switched from the periphery name display mode to the specified name display mode. According to the third embodiment, the user can easily select the either display mode at will when performing the map scroll search.

Figure 12A:
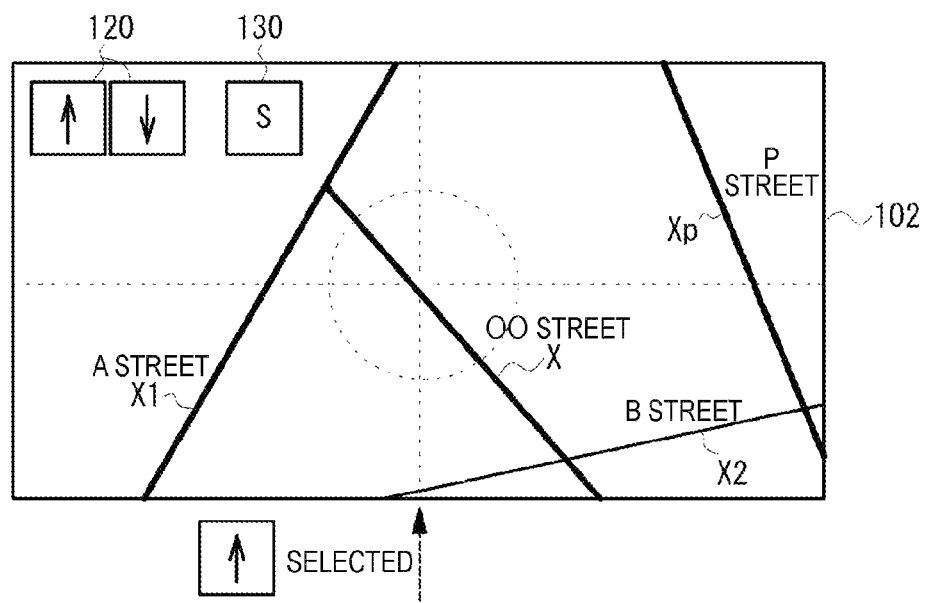
FIGS. 12A and 12B illustrate an example in which the scale of a deformed screen is changed according to a fourth embodiment of the present invention.
Figure 12B:
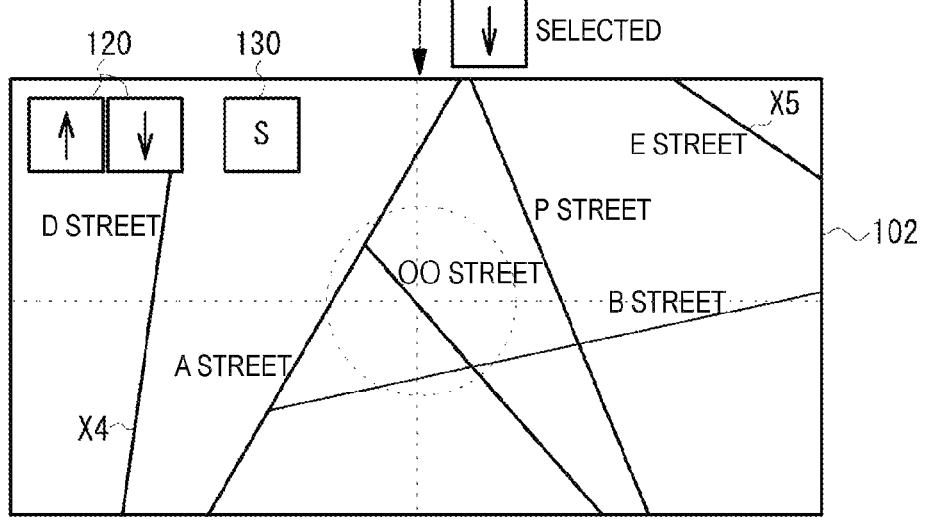

A fourth embodiment of the present invention will now be described. The fourth embodiment relates to a scale change and a display setting in a periphery name display mode. FIG. 12A illustrates a deformed screen 102 (the second embodiment) on which a road name is displayed in the periphery name display mode. In the fourth embodiment, a map scroll search program 80 displays, on the deformed screen 102, a scale change button 120 and a display setting button 130 to perform the display setting of the deformed screen, both of which can be selected by a user. The deformed screen of a wider area scale would be displayed as illustrated in FIG. 12B by selecting one arrow of the scale change buttons 120. Accordingly, the number of search object candidates to be selected as a display object would be further increased. Roads X4 and X5 are newly selected as the display object in the example illustrated in FIG. 12B, where the name of the roads X4 and X5, namely a "D Street" and an "E Street", are extracted and displayed as the road name for the roads X4 and X5, respectively. The scale of the deformed screen would be switched to a close-up scale by selecting another arrow.

Figure 13:
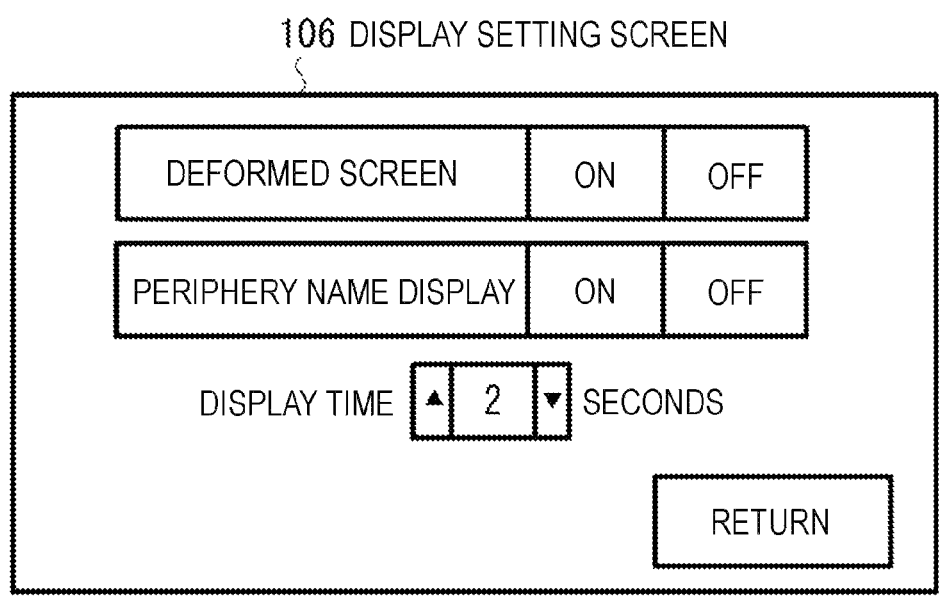
FIG. 13 is a diagram illustrating an example of a display setting screen according to the fourth embodiment of the present invention.

Moreover, a display setting screen 106 would be displayed when the display setting button 130 is selected, as illustrated in FIG. 13. On the display setting screen 106, a user can perform the detailed setting of whether to turn on or off the deformed display, whether to turn on or off the periphery name display mode, or the display time of the periphery name display mode, for example. The complexity of operation can thus be resolved by changing the display setting on the deformed screen by the user operation.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. An electronic device including a navigation function, the electronic device comprising:
    a display unit configured to display road map data on a display screen;
    a scroll unit configured to scroll a road map screen display on the display screen in response to a user input;
    a determination unit configured to determine if the scrolling has stopped;
    an identification unit configured to identify, when it is determined that the scrolling has stopped, a search object candidate specified by a position at which the scrolling has stopped;
    a selection unit configured to select a search object candidate being the same type as that of the search object candidate identified by the identification unit and being included in the road map screen displayed when the scrolling has been stopped;
    an acquisition unit configured to acquire name data of the search object candidate selected by the selection unit;
    a synthesis and display unit configured to synthesize and display the name data acquired by the acquisition unit onto the road map data, the scrolling of which has stopped; and
    a deformed screen creation unit configured to create a deformed screen image on the basis of the road map data displayed when the scrolling has been stopped, wherein to create the deformed screen image, the deformed screen creation unit is configured to modify a thickness of a line representing a road based on a number of lanes that make up the road;
    wherein the synthesis and display unit synthesizes and displays the name data in the deformed screen image.

2. The electronic device according to claim 1, wherein the synthesis and display unit ends synthesizing and displaying of the name data when a predetermined period of time has elapsed.

3. The electronic device according to claim 1, further comprising a display mode determination unit configured to determine a display mode between a specified name display mode in which a name of a search object candidate specified by a position at which the scrolling has been stopped, is displayed, and a periphery name display mode in which a name of the search object candidate selected by the selection unit, is displayed.

4. The electronic device according to claim 3, wherein the display mode determination unit determines the display mode on the basis of a user input.

5. The electronic device according to claim 3, wherein the display mode determination unit displays, on the road map screen being displayed, a user input button by which a user selects either the specified name display mode or the periphery name display mode.

6. The electronic device according to claim 1,
    wherein the display unit displays, on the road map screen displayed when the scrolling has been stopped, an input button by which a user changes a map scale, and
    wherein the selection unit selects a search object candidate from the road map screen, the map of which is scaled, when a user has changed the map scale through the input button.

7. The electronic device according to claim 1, wherein the display unit displays, on the road map screen displayed when the scrolling has been stopped, an input button by which a user performs display setting, and enables the display of a name of the search object candidate selected by the selection unit, when a user has performed the display setting through the input button.

8. The electronic device according to claim 1, wherein the synthesis and display unit ends the synthesis and the display of the name data in response to the scrolling.

9. The electronic device according to claim 1, wherein the selection unit selects a search object candidate, a name of which is not displayed on the road map screen displayed when the scrolling has been stopped.

10. A method for displaying a name of a search object candidate in a map scroll search performed by an electronic device having a navigation function, the method comprising steps of:

scrolling a road map screen when a map scroll search has been activated;

determining whether or not the scrolling has been stopped;

identifying, when it is determined that the scrolling has been stopped, a search object candidate specified by a position at which the scrolling has been stopped;

selecting a search object candidate which is the same type as that of the identified search object candidate and is included in the road map screen displayed, when the scrolling has been stopped;

acquiring name data of the selected search object candidate;

synthesizing and displaying the acquired name data onto road map data, the scrolling of which has been stopped; and creating a deformed screen image on the basis of the road map data displayed when the scrolling has been stopped, wherein creating the deformed screen image comprises modifying a thickness of a line representing a road based on a number of lanes that make up the road.

11. The method for displaying a name according to claim 10, wherein the step of synthesizing and displaying ends the synthesis and the display of the name data when a predetermined period of time has elapsed.

12. The method for displaying a name according to claim 10, wherein the step of synthesizing and displaying synthesizes and displays the name data on the deformed screen image.

13. The method for displaying a name according to claim 10, further comprising a step of determining a display mode between a specified name display mode in which a name of a search object candidate specified by a position at which the scrolling has been stopped is displayed, and a periphery name display mode in which a name of the search object candidate selected by the selection unit is displayed.

14. The method for displaying a name according to claim 13, wherein the step of determining a display mode determines the display mode on the basis of a user input.

15. The method for displaying a name according to claim 13, wherein the step of determining a display mode displays, on the road map screen being displayed, a user input button by which a user selects either the specified name display mode or the periphery name display mode.

16. A non-transient recording medium in which a program for displaying a name of a search object candidate in a map scroll search performed by an electronic device having a navigation function is recorded, the program comprising steps of:

scrolling a road map screen when a map scroll search has been activated;

determining whether or not the scrolling has been stopped;

identifying, when it is determined that the scrolling has been stopped, a search object candidate specified by a position at which the scrolling has been stopped;

selecting a search object candidate which is the same type as that of the identified search object candidate and is included in the road map screen displayed when the scrolling has been stopped;

acquiring name data of the selected search object candidate;

synthesizing and displaying the acquired name data onto road map data, the scrolling of which has been stopped; and creating a deformed screen image on the basis of the road map data displayed when the scrolling has been stopped, wherein creating the deformed screen image comprises modifying a thickness of a line representing a road based on a number of lanes that make up the road.

17. The recording medium in which a program for displaying a name is recorded according to claim 16, wherein the step of synthesizing and displaying ends the synthesis and the display of the name data when a predetermined period of time has elapsed.

18. The recording medium in which a program for displaying a name is recorded according to claim 16, wherein the step of synthesizing and displaying synthesizes and displays the name data on the deformed screen image.

19. The recording medium in which a program for displaying a name is recorded according to claim 16, the program for displaying a name further comprising a step of determining a display mode between a specified name display mode in which a name of a search object candidate specified by a position at which the scrolling has been stopped is displayed, and a periphery name display mode in which a name of the search object candidate selected by the selection unit is displayed.

20. The recording medium in which a program for displaying a name is recorded according to claim 16, wherein the step of determining a display mode determines the display mode on the basis of a user input.

21. The recording medium in which a program for displaying a name is recorded according to claim 20, wherein the step of determining a display mode displays, on the road map screen being displayed, a user input button by which a user selects either the specified name display mode or the periphery name display mode.

* * * * *